2,980,505

PROCESS OF PRODUCING ALKALI METAL SALTS OF UREA

Karl Hass and Kurt Deselaers, Luelsdorf, uber Troisdorf, Germany, assignors to Feldmuehle Papier- und Zellstoffwerke A.G., Dusseldorf-Oberkassel, Germany No Drawing. Filed Nov. 12, 1958, Ser. No. 773,136

Claims priority, application Germany Nov. 16, 1957

9 Claims. (Cl. 23—75)

The present invention relates to the production of metal salts of urea and more particularly to the production of alkali metal salts of urea.

Alkali metal salts of urea are known. For instance, a potassium salt of urea of the formula $CO(NHK)_2$ has been described in "Beilstein's Handbuch der Organischen Chemie," 4th Edition, vol. III, page 46. Such alkali metal salts of urea are useful as intermediates in the preparation of other valuable chemical compounds.

It is one object of the present invention to provide a simple and effective process of producing alkali metal salts of urea.

The process according to the present invention consists in principle in intimately mixing finely pulverized urea in solid form with a finely pulverized solid alkali metal alcoholate and heating the mixture to an elevated temperature below 100° C. and preferably to a temperature between about 75° C. and about 95° C. This process permits the production of alkali metal salts of urea in an especially simpler manner. When using as starting materials sodium methylate and urea in equimolecular amounts, the reaction may be illustrated by the following equation:

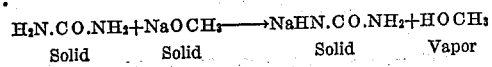

$$H_2N.CO.NH_2 + NaOCH_3 \longrightarrow NaHN.CO.NH_2 + HOCH_3$$

Solid    Solid           Solid       Vapor

It is quite surprising that this reaction between solid organic compounds can be carried out with an almost quantitative yield. It is furthermore of great advantage that the process according to the present invention yields directly a technically useful product which is stable on storage and shipment, which does not need to be purified and from which no impurities need be removed since the reaction is carried out in the absence of additional substances.

It is another advantage of this process that the alcohol recovered as by-product can be recycled and reused for producing the required alkali metal alcoholate, for instance, by reaction with the alkali metal amalgam of an electrolytic mercury cell. Preferably, the reaction is carried out in a vacuum-tight reaction vessel and in a vacuum. Vacuum accelerates the reaction and facilitates removal of the alcohol split off during the reaction from the reaction product.

As stated above, the reaction temperature must be kept below 100° C. in order to exclude side-reactions; for, it is known that urea and alkali metal alcoholate are converted into cyanates when exposed to higher temperatures. Thereby not only the alcohol but also ammonia are split off. Therefore, in order to avoid splitting off of ammonia, the reaction temperature in the process according to the present invention must be kept at least below 100° C.

Another difference of the process according to the present invention over the known process of producing cyanates consists in carrying out the reaction in the absence of any organic liquid serving as solvent. In contrast thereto, cyanate formation according to the known process is effected in the presence of an organic solvent.

It follows that the known process of making cyanates does not at all suggest to a person skilled in this art the process according to the present invention which yields an entirely different compound.

When producing alkali metal salts of urea according to the present invention, care must be taken that moisture is excluded because the presence of moisture may cause undesired side-reactions, as urea reacts with water and the alkali metal alcoholate to form an alkali metal carbonate and ammonia.

The alkali metal salts of urea obtained according to the present invention can be used as such without further purification, for instance, in the preparation of urea compounds substituted by organic radicals or groups. Such urea compounds are known as ureides. Said reaction proceeds in a very simple manner. For instance, compounds which contain reactive chlorine in organic linkage are converted, on reaction with the alkali metal salts of urea according to the present invention, into urea compounds substituted by organic radicals or groups, whereby alkali metal chloride is formed as by-product.

A further example of utilizing the alkali metal salts containing 1 mole of alkali metal for each mole of urea is their thermal decomposition. When heating the salt to a temperature exceeding 100° C. and preferably to a temperature between about 110° C. and about 150° C. the corresponding alkali metal cyanate of a high degree of purity is formed whereby ammonia is split off. The resulting alkali metal cyanate is substantially free of cyanide. In contrast to the known process, whereby urea and alkali metal alcoholates are reacted at a temperature exceeding 100° C. and whereby ammonia and alcohol are split off simultaneously, the new process of producing such alkali metal cyanates according to the present invention has the advantage that only ammonia is formed in the second reaction step and that, therefore, the heretofore necessary complicated process of separating ammonia and alcohol from each other in order to recycle said compounds is avoided.

The following examples serve to illustrate the present invention without, however, limiting the same thereto.

Example 1

60 kg. of finely pulverized urea and 54 kg. of finely pulverized sodium methylate are intimately mixed with each other in a vacuum-tight vessel provided with a stirring device. Thereby moisture is carefully excluded. As soon as the urea and the sodium methylate powder are completely and uniformly mixed with each other, the mixture is heated to a temperature between about 75° C. and about 95° C., while stirring is continued. Methanol is split off and the mixture attains a dough-like consistency. The methanol is continuously distilled off in a vacuum of 90 mm. Hg and is condensed in a condenser attached to the reaction vessel. It can be reused without further purification for producing sodium methylate in an electrolytic mercury cell.

As stated hereinabove, any increase of the reaction temperature above 100° C. must be avoided, because otherwise the resulting sodium salt of urea is decomposed into sodium cyanate and ammonia. The stirring device in the reaction vessel is preferably constructed in such a manner that it causes pulverization of the resulting urea salt during cooling. In such a finely pulverized form the sodium salt of urea can directly be used for chemical reactions or can be packed for shipment.

Example 2

70 kg. of finely pulverized potassium methylate and 60 kg. of finely pulverized urea are intimately mixed with each other in the reaction vessel used in Example 1. Reaction sets in at a temperature of about 25° C. and no additional heat need be supplied as the heat of reaction causes a considerable increase in the temperature of the mixture. Care must be taken that a temperature of 75° C. is not substantially exceeded in order to avoid potassium cyanate formation. If necessary, the reaction mixture is cooled.

Example 3

The sodium salt of urea obtained according to Example 1 or, respectively, the potassium salt of urea obtained according to Example 2, are heated in a reaction vessel provided with a stirring device to a temperature between about 110° C. and about 150° C. until no more ammonia is split off. The resulting reaction product is a substantially pure and cyanide-free sodium cyanate or, respectively, potassium cyanate. The ammonia split off during this reaction is substantially pure and can be used without further purification.

Although the alkali metal methylates have proved to be especially suitable for the purpose of the present invention, because methanol is readily removed from the reaction mixture due to its low boiling point, there may also be employed the alkali metal alcoholates of other alcohols, such as of ethanol, isopropanol, and the like whereby, however, care must be taken that, on removing the alcohols split off during the reaction, the temperature is kept well below 100° C.

As stated hereinabove, the reaction must be carried out at a temperature below 100° C. When using sodium methylate as the one reaction component, care should be taken that a temperature of about 95° C. is not exceeded while, with potassium methylate, the temperature is preferably kept below about 75° C. in order to avoid formation of undesired by-products.

Of course, many changes and variations in the starting materials, the reaction conditions, duration, and temperature, the apparatus used for carrying out the reaction, the methods of removing the alcohol from the reaction mixture and the like may be made by those skilled in the art in accordance with the principles set forth herein and in the claims annexed hereto.

We claim:

1. In a process of producing alkali metal salts of urea, the steps which comprise intimately mixing finely pulverized solid urea with the equimolecular amount of a finely pulverized solid alkali metal alcoholate and heating the resulting mixture to a temperature below 100° C. until no more alcohol is split off, said temperature being higher than the boiling point of said alcohol in said mixture.

2. The process according to claim 1, wherein the intimate mixture of urea and alkali metal alcoholate is heated to a temperature between about 75° C. and about 95° C.

3. The process according to claim 1, wherein the reaction is carried out with the exclusion of moisture.

4. The process according to claim 1, wherein the reaction is carried out in a vacuum and wherein the alcohol split off is removed by vacuum distillation.

5. In a process of producing the sodium salt of urea, the steps which comprise intimately mixing finely pulverized solid urea with a finely pulverized solid sodium methylate and heating the resulting mixture at a temperature between about 75° C. and about 95° C. until no more methanol is split off.

6. In a process of producing the potassium salt of urea, the steps which comprise intimately mixing finely pulverized solid urea with a finely pulverized solid potassium methylate and stirring the resulting mixture at a temperature of about 25° C. without externally supplying heat thereto until no more methanol is split off.

7. In a process of producing alkali metal cyanates, the steps which comprise intimately mixing finely pulverized solid urea with a finely pulverized solid alkali metal alcoholate, heating the resulting mixture at a temperature below 100° C. until no more alcohol is split off, said temperature being higher than the boiling point of said alcohol in said mixture, separating said alcohol from said mixture in the gaseous state, and increasing the temperature of the resulting alkali metal salt of urea to a temperature substantially exceeding 100° C. until no more ammonia is split off.

8. In a process according to claim 1, said alcoholate being an alcoholate of a saturated aliphatic alcohol having a carbon chain including not more than three carbon atoms, and a boiling point at atmospheric pressure of not more than 85° C.

9. In a process according to claim 7, said alcoholate being an alcoholate of a saturated aliphatic alcohol having a carbon chain including not more than three carbon atoms, and a boiling point at atmospheric pressure of not more than 85° C.

References Cited in the file of this patent

UNITED STATES PATENTS

| | | |
|---|---|---|
| 1,816,911 | Pfleger et al. | Aug. 4, 1931 |
| 2,090,592 | Jacobson | Aug. 17, 1937 |
| 2,801,154 | DePree et al. | July 30, 1957 |
| 2,889,198 | Barrett et al. | June 2, 1959 |